(12) United States Patent
Maienschein et al.

(10) Patent No.: US 8,382,597 B2
(45) Date of Patent: Feb. 26, 2013

(54) VIBRATION DAMPER

(75) Inventors: Stephan Maienschein, Baden-Baden (DE); Peter Droll, Karlsruhe (DE); Eugen Kombowski, Buehl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 149 days.

(21) Appl. No.: 12/966,554

(22) Filed: Dec. 13, 2010

(65) Prior Publication Data

US 2011/0143842 A1 Jun. 16, 2011

(30) Foreign Application Priority Data

Dec. 14, 2009 (DE) .......................... 10 2009 058 251

(51) Int. Cl.
*F16F 15/121* (2006.01)

(52) U.S. Cl. ..................................... 464/68.1

(58) Field of Classification Search ................. 464/68.1, 464/68.7, 68.8; 192/213–213.31
See application file for complete search history.

(56) References Cited

U.S. PATENT DOCUMENTS

| 4,559,024 | A | * | 12/1985 | Tamura et al. ........... 464/68.8 X |
| RE33,984 | E | * | 7/1992 | Spitler ....................... 192/213.3 |
| 2010/0133061 | A1 | | 6/2010 | Kombowski | |

FOREIGN PATENT DOCUMENTS

| DE | 102008032009 | 2/2009 |
| EP | 2085654 | 8/2009 |

* cited by examiner

*Primary Examiner* — Gregory Binda
(74) *Attorney, Agent, or Firm* — Simpson & Simpson, PLLC

(57) ABSTRACT

A vibration damper comprising at least two damper assemblies connectable in series, coupled with one another through a floating intermediary flange, and torque transmission devices and/or damping coupling devices and rotation angle limiting devices between the floating intermediary flange and a damper component of one of the damper assemblies, wherein the damper component is disposed in a force flow in front and/or behind the floating intermediary flange.

8 Claims, 4 Drawing Sheets

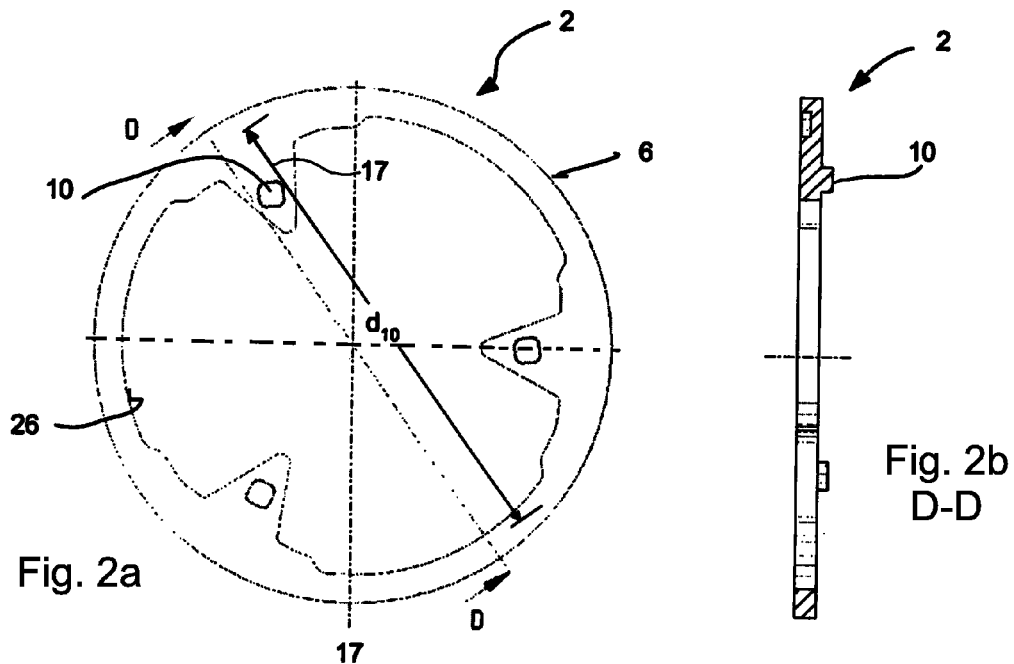
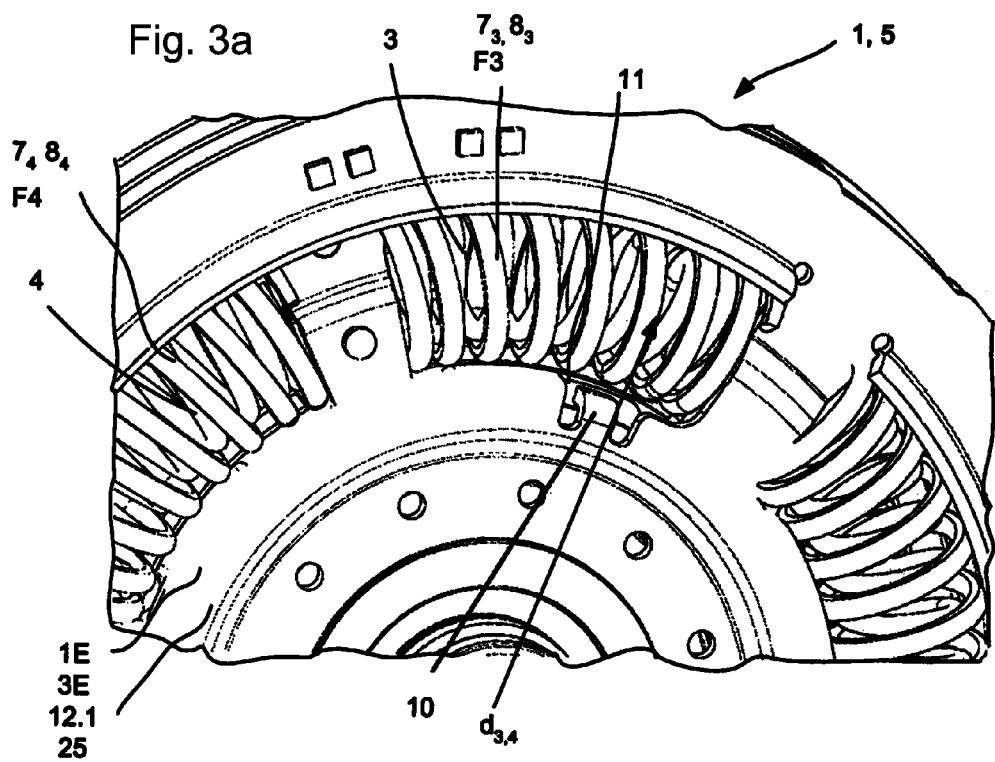

VIBRATION DAMPER

CROSS-REFERENCE TO RELATED APPLICATIONS

This application claims priority from German Patent Application No. 10 2009 058 251.7, filed Dec. 14, 2009, which application is incorporated herein by reference in its entirety.

FIELD OF THE INVENTION

The invention relates to a vibration damper including at least two damper assemblies, connectable in series, coupled with one another through a floating intermediary flange and including torque transmission devices and/or damping coupling devices, and including rotation angle limiting devices between the floating intermediary flange and a damper component of one of the damper assemblies connected in a force flow in front and/or behind the floating intermediary flange. The invention relates in particular to a device for damping vibrations for applications in force transmission devices with actuatable clutch devices in hydrodynamic components for applications in motor vehicles.

BACKGROUND OF THE INVENTION

Vibration dampers, in particular, configured as series dampers, including at least two damper stages connectable in series, are known in the art in various configurations. We are referring to a genus defining type according to DE 10 2008 032 009 A1, which includes two coaxially disposed damper assemblies, which are coupled with one another through an intermediary flange. Each of the damper assemblies includes torque transmission devices and damping coupling devices which are functionally implemented by a component configured as a spring unit. The floating intermediary flange forms a portion of both damper assemblies, wherein the input component of the first damper assembly is disposed in front of the intermediary flange in the force flow, while the output component of the second damper assembly is disposed after the intermediary flange in the force flow. The intermediary flange itself functions as an output component for the first damper assembly and as an input component for the second damper assembly. The input component of the first damper assembly in the embodiment illustrated in the recited printed document forms the drive side main damper component and includes two lateral disks, disposed offset in axial direction, and coupled with one another non-rotatably. The non-rotatable coupling is performed in a radial direction outside of the radially outer damper assembly and within the extension of the outer circumference of the intermediary flange, wherein the devices for non-rotatable coupling are being simultaneously used for rotation angle limiting between the intermediary flange and the input component of the first damper assembly. Thus, the intermediary flange is configured with protrusions oriented in a radial direction, which are offset from one another in a circumferential direction and form stop surfaces at the attachment devices for the two side disks of the main damper component. This embodiment is characterized by additional space requirement in a radial direction, since the rotation angle limitation is disposed in the radial direction herein.

From the printed document EP 2 085 654 1A, an embodiment of a device for damping vibrations in a force transmission device with an actuatable clutch device and a hydrodynamic component is known. This device is respectively disposed after the actuatable clutch device and the hydrodynamic component respectively in the force flow and includes at least two damper stages which are coupled to one another through an intermediary flange functioning as a transmission element, wherein depending on the operating mode, the coupling of the particular damper stages is performed in different ways and the intermediary flange is connected non-rotatably with the input component of the device or forms the input component of the device in one operating mode. For a force transmission through the actuatable clutch device, the transmission component functions as an output component of the first damper assembly and as an input component of the second damper assembly, wherein a rotation angle limitation between the input component and the output component of the first damper assembly, and thus, the component disposed in the force flow in front of the transmission element, and the transmission element is generated in that axial protrusions are disposed at the component disposed in front of the transmission element, which extend in an axial direction into the pass-through openings at the transmission element. In a second operating mode, the transmission element is coupled non-rotatably with the turbine shell of the hydrodynamic component. This embodiment does not include a floating intermediary flange and the intermediary flange is simultaneously used for axially supporting the spring units.

BRIEF SUMMARY OF THE INVENTION

It is an object of the invention to improve a vibration damper including damper assemblies connected in series, wherein the damper assemblies are coupled with one another through a floating intermediary flange, so that at least one, and preferably both, damper assemblies can be secured against an overload. The device is characterized by a large damping capacity. Furthermore, the implemented overload safety for the particular spring units of the particular damper assemblies are implemented without additional radial installation space requirement.

The vibration damper includes at least two damper assemblies, connectable in series, coupled with one another through a floating intermediary flange and including torque transmission devices and/or damping coupling devices, and includes rotation angle limiting devices between the floating intermediary flange and a damper component of one of the damper assemblies connected in a force flow in front and/or behind the floating intermediary flange, and is characterized according to the invention in that the rotation angle limiting devices include at least one axial protrusion, disposed at the intermediary flange or at the damper component connected in the force flow in front thereof and/or thereafter and extending in an axial direction respectively to the other damper component disposed in the force flow in front and/or thereafter or to the intermediary flange, wherein the axial protrusion engages a recess at the respective other damper component with a clearance in a circumferential direction characterizing the permissible rotation angle.

The damper component connected in front or after the intermediary flange in the force flow is the damper component coupled to the intermediary flange through torque transmission devices and/or damping coupling devices, typically a flange or a lateral disc.

The particular axial protrusion configured as a solid stop limits the relative rotation between the intermediary flange and the damper component respectively connected in front thereof or thereafter in the force flow and in particular protects the torque transmission devices and the damping and/or coupling devices against the overload.

The solution according to the invention avoids forming radial protrusions at the intermediary flange for rotation angle limitation and moves this function into the installation space required for the respective damper assembly. Configuring the devices for rotation angle limitation is furthermore performed in a simple manner at components that are adjacent in an axial direction. The installation space in radial direction thus released can be used for disposing the damper assemblies, in particular the torque transmission devices and/or the damping coupling devices. In particular they can be displaced to a larger effective diameter for the same installation space which provides an increase in the damper capacity.

The functions of the torque transmission devices and/or damping coupling devices can be respectively performed by separate elements or in a particularly advantageous embodiment in a functional concentration of identical components preferably configured as spring units. The spring units can have a common effective diameter.

With respect to configuring the particular axial protrusion, there are a plurality of options. In a particularly advantageous embodiment the particular axial protrusion and the intermediary flange or the damper component disposed in front in the force flow direction and/or disposed thereafter in force flow direction are configured as integral components. The particular axial protrusion is thus formed as a function of the selected manufacturing process of the intermediary flange at the intermediary flange or subsequently configured through forming, in particular bending or as an opening through embossing. The latter option has the advantage of a space saving free arrangement of the protrusions and thus the option to adapt a standardized intermediary flange to different damper configuration embodiments. In particular, during embossing the axial protrusion performing the function of a spacer bolt is formed entirely by the material of the intermediary flange or the damper component connected in the force flow in front thereof or thereafter. Openings at the intermediary flange or at other components are avoided and thus weakening these components is avoided. Based on the component weakening which is not being performed, there is the option to dispose such protrusions anywhere at the intermediary flange provided.

Alternatively there is the option to form the particular axial protrusion of a separate damper component that is connected in the force flow direction in front of the intermediary flange and/or thereafter or of a stop element connected non-rotatably with the component in a disengageable or non-disengageable manner. The stop element can be configured, e.g., as a rivet, bolt or pin. This option also has the advantage that the protrusions are freely disposable.

The particular damper assemblies arranged in series are preferably disposed on a common effective diameter in order to implement compact construction, wherein the effective diameter corresponds to the mean arrangement diameter of the spring units and the damper assemblies are arranged in an axial plane. For a respective intermediary flange configuration also an arrangement of different diameters and/or different axial planes is conceivable.

In order not to impair the function of the intermediary flange, the arrangement of the particular axial protrusions is performed in the portion with high material concentration. The particular axial protrusion can thus be configured in a first embodiment in the portion of the inner circumference or the outer circumference of the intermediary flange and/or of the damper component disposed in front and/or after the intermediary flange in the force flow direction, preferably directly at the inner or outer circumference. In this embodiment configuring the protrusions can be performed in a particularly advantageous manner through bending. According to a second embodiment the arrangement at the contact and the support surfaces for the damping/coupling devices forming radial protrusions is provided at the intermediary flange.

In order to assure a rotation angle limitation also for a force induction on the different diameters into the input component of the vibration damping device in each functional state and in order to run the force flow through the vibration damping device in a blocked configuration, wherein the other components do not have to be configured for maximum load, the arrangement of a single axial protrusion in the radial direction is performed within the effective diameter of the torque transmission devices and/or damping coupling devices, in particular below the devices at the intermediary flange and/or the damper component arranged in the force flow direction in front or after the damper component.

The recess at the intermediary flange interacting with the axial protrusion and/or the damper component disposed in the force flow in front and/or after the intermediary flange can be configured as a blind opening and/or pass-through opening. The latter option has the advantage of the recess reaching through the protrusion and the contact surfaces having a greater extension in the axial direction.

The rotation angle limiting devices preferably include a plurality of axial protrusions and recesses for uniform force induction wherein the particular axial protrusions and recesses are respectively disposed on one arrangement radius and are disposed in the circumferential direction with a constant distance from one another.

In a particularly advantageous embodiment both or all damper assemblies of a device are protected against overload by rotation limiting devices.

In an advantageous embodiment each damper assembly includes an input component and an output component. The intermediary flange forms the output component of the first damper assembly and the input component of the second damper assembly, wherein the intermediary flange is configured divided or integral in one piece. The input component of the first damper assembly is disposed and configured so that it is connectable with an actuatable coupling device and a turbine shell, while the output component of the second damper assembly is connectable non-rotatably with an output side component and rotation angle limitation devices are provided between the input component and the intermediary flange and/or the intermediary flange and the output component of the second damper assembly.

BRIEF DESCRIPTION OF THE DRAWINGS

The invention is described with reference to drawing figures, wherein:

FIGS. 2a & 2b illustrate an embodiment of an intermediary flange according to FIGS. 1a-1c based on two views according to FIGS. 1a-1c;

FIGS. 3a & 3b illustrate another embodiment of the rotation angle limiting devices including axial protrusions at a component connected in front in the force flow with reference to two views; and, FIG. 4 illustrates an embodiment with a rotation angel limitation between an intermediary flange and a damper component arranged thereafter in the force flow in particular an output component of the vibration damper.

DETAILED DESCRIPTION OF THE INVENTION

Figure 1A:
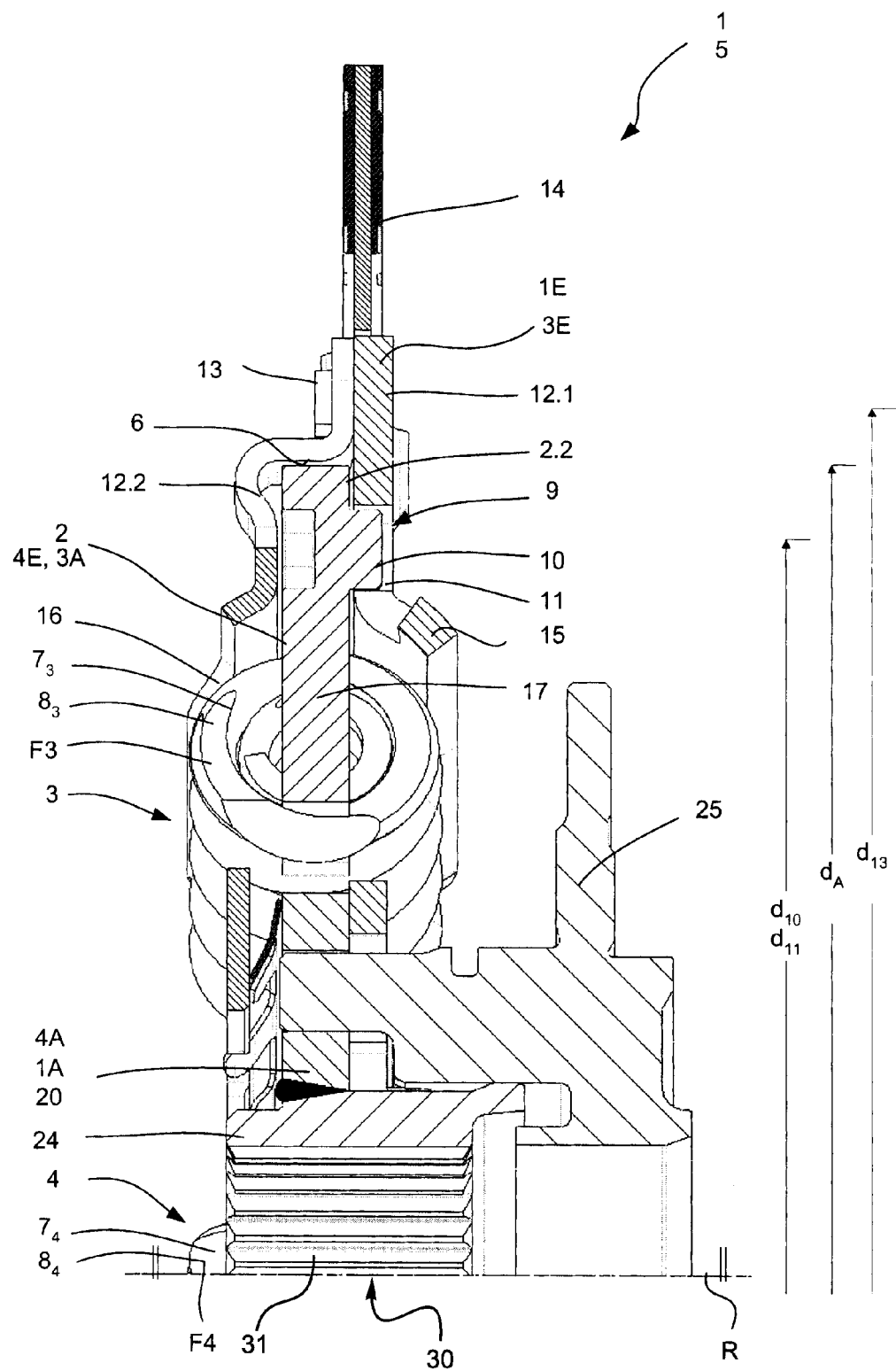
FIG. 1a-1c illustrate an embodiment of a vibration damper with a first embodiment of the rotation angle limit devices between the intermediary flange and the damper component disposed in front in force flow direction in different views.
Figure 1B:
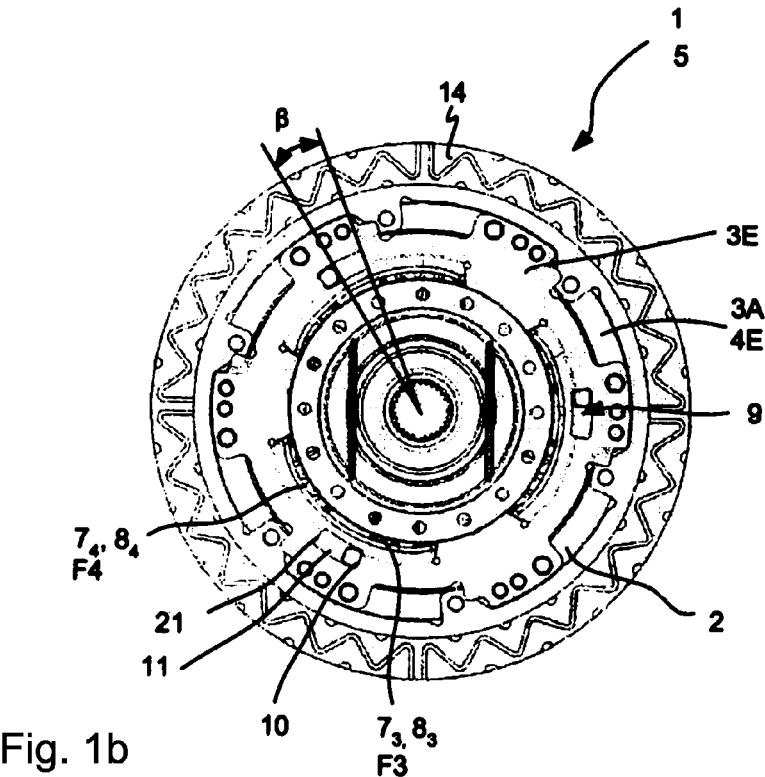
Figure 1C:
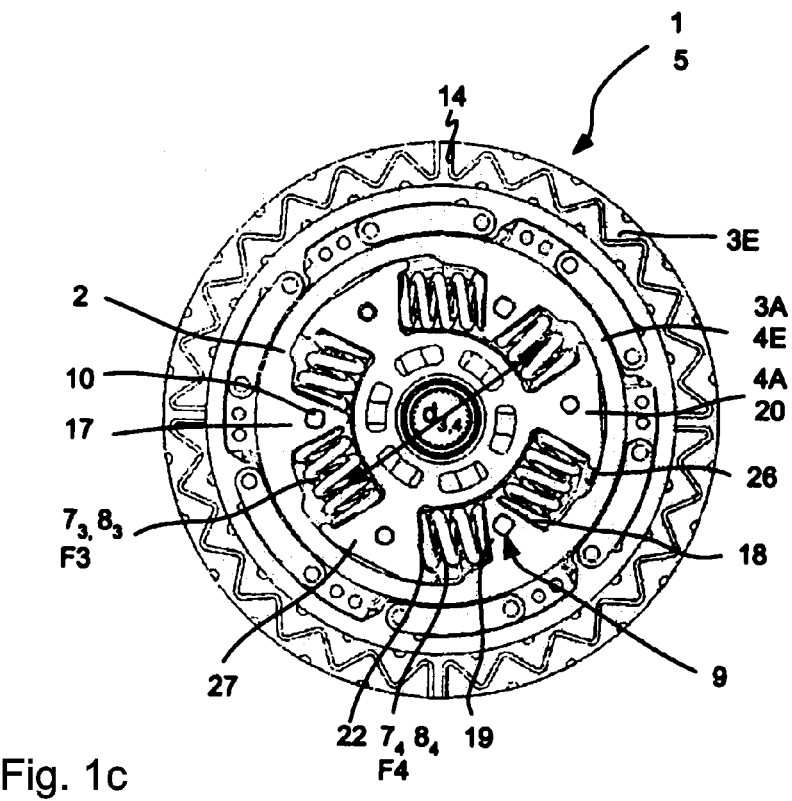

FIGS. 1a-1c illustrate a preferred embodiment of vibration damper 1 in an exemplary manner in different views. FIG. 1a illustrates a detail from an axial sectional view with reference to the rotation axis R. The subsequent description relates to all FIGS. 1a-1c and the components respectively illustrated therein. The vibration damper 1 in the illustrated case includes two coaxially arranged damper assemblies 3 and 4, connected in series and coupled with one another through a one piece floating intermediary flange 2. The two damper assemblies 3 and 4 form a series damper 5. Each of the particular damper assembles 3 and 4 viewed in force flow direction respectively includes at least one input component 3E, 4E and an output component 3A, 4A which can be configured in one component or in several components. The respective input- and output components 3E, 4E, 3A, 4A of a damper assembly 3, 4 are disposed coaxial relative to one another and rotatable relative to one another in circumferential direction within limits. In order to transfer torque in the elastic coupling function the respective input and output components are coupled with one another respectively through torque transmission devices $7_3$ and $7_4$ and damping coupling devices $8_3$ or $8_4$. The floating intermediary flange 2 functions in a first damper assembly 3 as an output component 3A and for the second damper assembly 4 as an input component 4E.

The input component 3e of the damper assembly 3 in this embodiment simultaneously forms the input component 1E of the device 1, which input component can also be designated as the drive side main damper component. The output component 4A of the second damper assembly 4 corresponds to the output component 1A of device 1 and thus to an output side main damper component. The intermediary flange 2 is disposed in the force flow therebetween. The intermediary flange is not directly coupled non-rotatably with a damper component disposed in front or behind the intermediary flange in the force flow direction or with an element coupled non-rotatably with the damper component.

The torque transmission devices $7_3$ and $7_4$ and the damping coupled devices $8_3$ and $8_4$ are arranged in a particularly advantageous embodiment through a functional concentration of like components, in the illustrated case, spring units F3 and F4, which can be configured as tension or compression springs, where each damper assembly 3, 4 includes a plurality of spring units F3, F4 which are disposed in the circumferential direction with the same partitioning. The particular damper assemblies 3, 4 and thus the spring units F3, F4 are preferably disposed on the same effective diameter $d_{3/4}$. The configuration of the particular damper assemblies 3, 4, in particular, of the spring units F3, F4, can be performed in a different manner. In order to secure at least one of the damper assemblies 3 and/or 4 against overload, devices 9 for limiting the rotation angle are provided between the floating intermediary flange 2 and the damper component disposed in front and/or after the intermediary flange in the force flow direction and disposed in the axial direction in parallel with the intermediary flange. Preferably the arrangement of the devices 9 is performed between the floating intermediary flange 2 and the damper component disposed in the force flow direction in front of the intermediary flange. The rotation angle limiting devices 9 according to the invention include at least one protrusion 10 disposed at the intermediary flange 2 and/or the damper component disposed in the force flow direction in front or behind the intermediary flange and the protrusion extending in the axial direction; this means parallel to the rotation axis. The particular protrusion 10 engages a recess 11 at the damper component respectively disposed in front and/or behind the intermediary flange 2 in the force flow direction and adjacent in the axial direction, wherein the engagement is performed with a clearance in the circumferential direction. This characterizes a theoretically possible rotation angle β between the intermediary flange 2 and the damper component in the circumferential direction.

The particular axial protrusion 10 is disposed in the illustrated case advantageously at the intermediary flange 2, in particular at the face 2.2. Thus, at least a protrusion of this type is provided, preferably a plurality of protrusions. They are disposed in the circumferential direction at the intermediary flange 2, preferably on a common diameter $d_{10}$ with a uniform distance from one another. Accordingly, the recesses 11 at the damper component disposed in front or thereafter also have to be disposed on a diameter $d_{11}$, which respectively corresponds to the diameter $d_{10}$, and also have to be disposed with uniform distances from one another in the circumferential direction. The particular axially aligned protrusion 10 respectively forms a stop element which contacts circumferentially oriented surfaces 21 of the particular recesses 11 which form stops for a movement of the intermediary flange 2 relative to the damper component disposed in front thereof, thus the input component 1E of device 1, in particular the input component 3E of damper assembly 3. Thus, spring units F3 of first damper assembly 3 are protected against overload.

The embodiment according to FIGS. 1a-1c illustrates device 1 for damping vibrations in which input component 1E is formed by two lateral discs 12.1 and 12.2 disposed coaxially relative to one another and disposed at least over a partial portion in the axial direction offset from one another. Side discs 12.1 and 12.2 are connected with one another through devices 13 for non-rotatable coupling, preferably configured as fastener elements. The devices 13 can be configured as friction locked or form locked fastener elements. In the illustrated case the attachment elements configured as rivets are preferably provided which facilitate a non-disengageable form locked connection of two side discs 12.1 and 12.2. Side disc 12.1 is connected non-rotatably with a drive side component, in the illustrated case clutch disc 14. In a particularly advantageous manner the arrangement of clutch disc 14 is performed in the radial direction on a larger diameter than side disc 12.1. Thus, an arrangement of clutch disc 14 and side disc 12.1 is facilitated in one axial plane or with only minor axial offset from one another. The connection of two side discs 12.1. and 12.2 is performed on diameter $d_{13}$ which is disposed in the radial direction above the radially outer dimensions, in particular of outer circumference 6 of floating intermediary flange 2. The particular side discs 12.1 and/or 12.2 are thus configured and formed, so that they define a portion with a distance from one another extending in the axial direction forming an axial intermediary space in which intermediary flange 2 is disposed as a center damper component. Thus, intermediary flange 2 includes axially extending protrusions 10 which engage recesses 11 disposed at side disc 12.1 with a clearance in the circumferential direction. This is depicted in FIG. 1b in a view from the right according to FIG. 1a onto device 1. The particular axial protrusions 10 form contact pins which come into contact at circumferentially aligned surfaces 21 of recesses 11 when reaching the maximum rotation angle. The particular recesses 10 are disposed evenly spaced from one another in the circumferential direction on diameter 11. Their extension angle in the circumferential direction and the dimensions of axial protrusion 10 in the circumferential direction describe the maximum rotation angle β for intermediary flange 2 relative to side disc 12.1.

Devices $7_3$ for torque transmission and $8_3$ for damping coupling configured as spring units F3 are then supported with an end portion in the circumferential direction at both side discs 12.1 and 12.2 and with the opposite end portions at intermediary flange 2. Thus, side discs 12.1 and 12.2 are configured accordingly and form stop surfaces oriented in the circumferential direction or surface portions for spring unit F3 at which point spring unit F3 comes into contact. Thus, the particular side discs 12.1 and 12.2 include respectively circumferentially oriented recesses 15 and 16 provided for supporting spring units F3 which form circumferential oriented contact surfaces for spring elements F3. Intermediary flange 2 which is visible according to FIG. 1c in a view according to FIG. 1b without side disc 12.1 is configured as an annular element with protrusions 17 disposed at inner circumferential 26 and oriented in the radial direction. Protrusions 17 thus form surfaces 18 oriented in the circumferential direction and oriented towards the support of spring units F3 and surfaces 19 oriented in the opposite direction in the circumferential direction for supporting spring units F4. Outer circumference 6 of intermediary flange 2 is characterized by diameter $d_A$ which is disposed within the arrangement for the non-rotatable connection 13 in the radial direction between input component 3E of damper assembly 3 in the form of the two side discs 12.1 and 12.2. The arrangement of axial protrusions 10 at intermediary flange 2 on diameter $d_{10}$, wherein the protrusions form a stop element, arranged in the radial direction outside of protrusions 17 at intermediary flange 2, in particular above the radial extension of spring units F3 or F4. Also, output component 4A configured as flange 20 is visible in this illustration, wherein flange 20 includes radial protrusions 27 disposed in the radial direction at the outer circumference and circumferentially oriented stop or support surfaces 22 for spring units F4 of second damper assembly 4.

In the illustrated case each of damper assemblies 3, 4 include three spring units F3 or F4 in an exemplary manner. They are alternatively disposed in the circumferential direction and are supported at the contact or support surfaces 18 and 19 of two protrusions 17 of intermediary flange 2, and they are supported with the respectively other end portion either at input component 1E of device 1 or at output component 1A of device 1 or 4A of second damper assembly 4 configured as flange 20.

Now when a torque is introduced through input component 1E into vibration damper 1 the torque is transmitted through spring units F3 of first damper assembly 3, wherein spring units F3 configured as compression spring units transfer the torque onto intermediary flange 2 and from the intermediary flange through spring units F4 onto output component 1A. In order to protect spring units F3 against overload, devices 9 between intermediary flange 2 and side disc 12.1 and input component 3A are provided. In an advantageous embodiment, devices 9 are thus disposed in a simple manner in the radial direction in a plane characterized by the position of protrusion 17 and of rotation axis R.

The FIGS. 1a-1c illustrate a particularly advantageous embodiment of a device 1 configured as a compression spring damper. The connection in a force transmission device for example at a turbine shell is performed through a turbine drive plate 25 which is connected torque proof with the flange 20. For an open clutch the device 1 functions as an absorber. The flange 20 is connected herein torque proof with a damper hub 24. In an example embodiment, damper hub 24 includes inner circumferential surface 30 with splines 31. The solution according to the invention is thus not limited to this embodiment. In an example embodiment, axial protrusions (10) are disposed at the intermediary flange (2) in a portion of radial protrusions (17) which form contact and support surfaces (18, 19) for the devices ($7_3$, $7_4$, $8_3$, $8_4$) for torque transmission or damping coupling.

With respect to the configuration of protrusions 10 to be provided in the axial direction there are no restrictions. Protrusions 10 are disposed within inner circumference 26 and outer circumference 6 of intermediary flange 2. According to a particularly advantageous embodiment in FIGS. 2a and 2b, they are configured as an integral component with intermediary flange 2. FIG. 2a illustrates a view of intermediary flange 2 according to FIG. 1b and FIG. 2b illustrates an axial sectional view D-D according to FIG. 2a. Thus, it is apparent that the arrangement of particular axial protrusions 10 forming stop elements is performed in the circumferential direction preferably with the same partition, this means with a constant offset in the circumferential direction from one another on effective diameter $d_{10}$. Furthermore, the axial expansions configured as protrusions 10 are configured herein in a portion with large component thickness or material thickness, in particular in the portion of the configuration of protrusions 10 oriented in the radial direction towards rotation axis R in their extension in the circumferential direction and in the radial direction viewed above inner diameter 26. The integral embodiment is provided in a particular advantageous manner through configuring recesses through forming in particular, embossing.

Another embodiment, which is not illustrated herein, is characterized by forming axial protrusions 10 through a separate element. The element can be connected in a disengageable manner according to a first embodiment with intermediary flange 2 which facilitates a subsequent arrangement and any configurations and adaptations of the particular axial protrusion 10. The connection can be performed in a friction or form locked manner. According to another embodiment it is conceivable to configure the connection between the separate element and intermediary flange 2 in a non-disengageable manner, wherein this can be performed through form locking in the form of rivets or through bonding. Both options however, cause additional manufacturing complexity.

The axial protrusion itself can be configured as a simple axial rise with any geometry. Thus, in an advantageous embodiment the surfaces of the particular axial protrusion interacting with the stop surfaces in circumferential direction are configured, so that a surface contact is assured upon contacting in order to facilitate low surface pressure. Furthermore, the sizing is configured, so that the support within recess 11 is preferably without any contact until stop surface 21 is reached, so that friction is avoided as far as possible.

According to an advantageous embodiment all damper assemblies 3 and 4 coupled with one another through intermediary flange 2 are protected against overload. This is assured through devices 9 for rotation angle limiting between input component 1E and intermediary flange 2 and devices 23 for rotation angle limiting between the intermediary flange 2 and the damper component subsequently disposed in the force flow, in particular the output component 1A. It is also conceivable to dispose axial protrusions 10 not at intermediary flange 2, but at the damper component disposed in front or disposed subsequently thereto in the force flow.

Figure 3B:
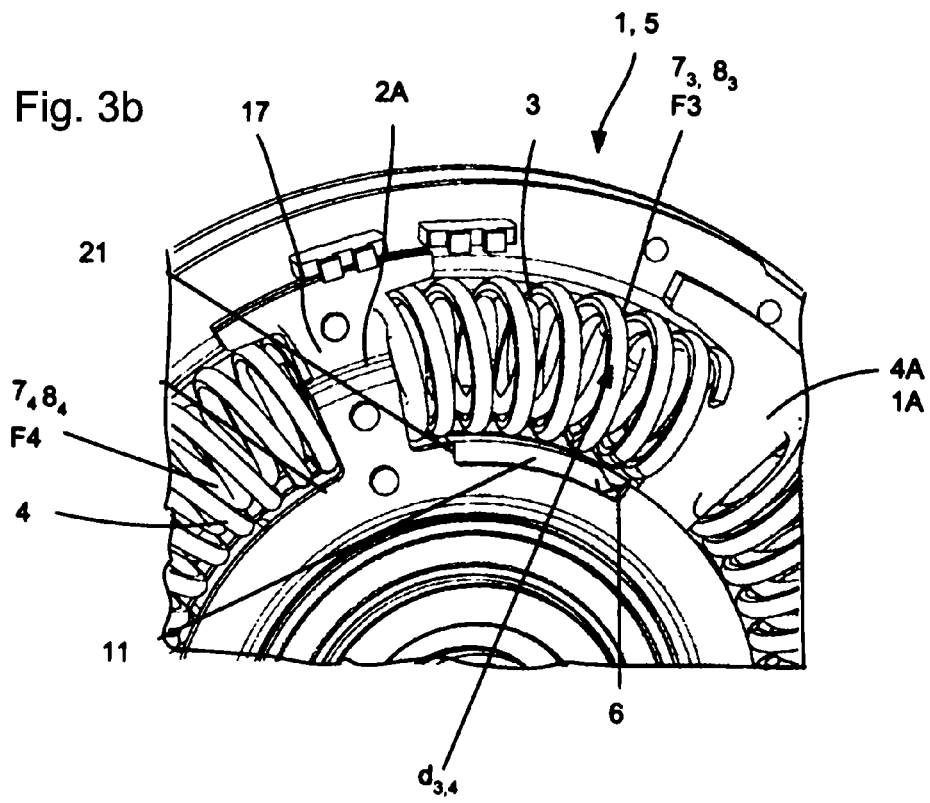

FIG. 3a emphasizes based on a detail of a view from the right analogous to FIG. 1b, another particularly advantageous embodiment of vibration damper 1 for use in so-called force transmission devices with power division between an actuatable clutch device and a hydrodynamic component between the input and the output of the actuatable clutch device. Vibration damper 1 is not only connected after an actuatable clutch device, but simultaneously also after the hydrodynamic component in the force flow. Thus, input component 1E is coupled with the actuatable clutch device and also with a turbine shell of the hydrodynamic component. Also here, two damper assemblies 3, 4 are provided which are connected in series through intermediary flange 2. The arrangement of rotation angle limiter 9 is performed between intermediary flange 2 and a component disposed in front in the force flow in the illustrated case with turbine drive plate 25 formed by side disc 12.1. The turbine drive plate is thus coupled at least indirectly non-rotatably with the turbine shell of a hydrodynamic component wherein the turbine shell is not illustrated. The embodiment of the axial expansion or protrusions 10 is thus not implemented at intermediary flange 2, but at a component disposed in the force flow in front of intermediary flange 2, thus turbine drive plate 25. Intermediary flange 2 is configured in the illustrated case as a divided intermediary flange made from intermediary flange components 2A, 2B with protrusions 17 configured in a radial direction at outer circumference 6 for forming the stop and support surfaces for spring units F3, F4. Circumferentially extending recesses 11 are provided at intermediary flange 2, wherein the recesses are preferably configured in a radial direction within effective diameter $d_{3,4}$ of damper assemblies 3 or 4 in a particular advantageous embodiment within the inner arrangement diameter of the devices $7_3$, $8_3$, $7_4$, $8_4$ formed by spring units F3, F4. Recesses 11 are disposed at intermediary flange 2A at outer circumference 6. This is illustrated in FIG. 3b without side disc 12.1.

The embodiment depicted in FIGS. 3a and 3b illustrates an alternative embodiment of the axial expansions configured as protrusions 10 at the element disposed in the force flow. The embodiment according to FIG. 3a furthermore illustrates a configuration of axial protrusions 10 by forming axially aligned protrusions in a portion of the outer circumference of the element or damper component configured as turbine plate 25 disposed in force flow in front of turbine flange component 2A. Recesses 11 at intermediary flange 2a which interact with turbine plate 25 forming stop surfaces 21 for axial protrusions 10 and oriented in the circumferential direction are thus arranged according to FIG. 3b in an exemplary manner also in the portion of the outer diameter 6 of intermediary flange component 2A.

Figure 4:
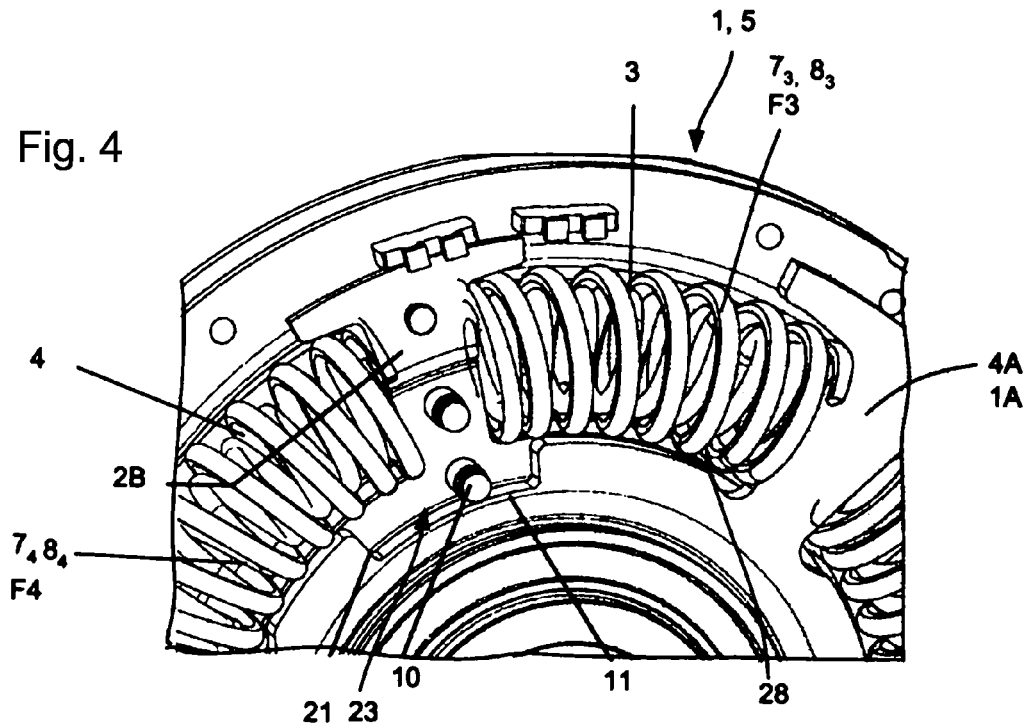

FIG. 4 illustrates device 1 in a view from the right according to FIGS. 3a, 3b without turbine plate 25 and without intermediary flange 2A the view onto intermediary flange 2b and the damper component subsequently disposed in the force flow and configured as output component 4A of second damper assembly 4, in particular 1A of device 1. Thus, it is visible that devices 23 for rotation angle limitation are provided between intermediary flange component 2B which is connected non-rotatably with intermediary flange 2A according to FIGS. 3a, 3b, wherein rotation angle limiting devices 9 can be configured analogously to devices 9. Thus, axially oriented protrusions 10 are provided at intermediary flange 2B, wherein the protrusions form stop elements configured as spacer bolts which furthermore engage recesses 11 at output component 4A of second damper assembly 4, preferably in the portion of outer circumference 28 of output component 4A. The arrangement of rotation angle limiting devices 23 is thus performed within the effective diameters of particular damper assemblies 3 and 4. The arrangement is furthermore performed preferably in a radial direction completely below the arrangement of spring units F3, F4 of particular damper assemblies 3 and 4.

For the embodiments illustrated in FIGS. 3a, 3b and 4 the excessive torque can be transmitted on a very short path from the turbine shell through turbine drive plate 25 onto intermediary flange 2 and from intermediary flange 2 into main flange 20 which is placed on the transmission shaft. This is in particular implemented in that the full torque is transmitted before actual protrusions 10 contact stop surfaces 21 of the recesses.

REFERENCE NUMERALS AND DESIGNATIONS 1 vibration damper
1E input component of the vibration damper
1A output component of the vibration damper
2 floating intermediary flange
2A, 2B intermediary flange component
2.2 face
3 first damper assembly
3E input component of the first damper assembly
3A output component of the first damper assembly
4 second damper assembly
4E input component of the second damper assembly
4A output component of the second damper assembly
5 series damper
6 outer circumference
$7_3$, $7_4$ torque transmission devices
$8_3$, $8_4$ damping coupling devices
9 rotation angle limiting device
10 axial protrusion
11 recess
12.1, 12.2 lateral disc
13 non-rotatable coupling device
14 clutch disc
15 recess at side disc 12.1
16 recess at 12.2
17 protrusion at intermediary flange
18 contact or support surface at intermediary flange
19 contact or support surface at intermediary flange
20 flange
21 surface oriented in circumferential direction
22 contact or support surface
23 relative rotation safety device
24 damper hub
25 turbine drive plate
26 inner circumference of intermediary flange
27 radial protrusion
R rotation axis
$d_{3,4}$ effective diameter of damper assemblies 3, 4
$d_{10}$ arrangement diameter of the protrusions
$d_{11}$ arrangement diameter of the recesses
$d_{13}$ arrangement diameter of the devices 13 for non-rotatable connection
$d_4$ outer diameter of intermediary flange
$d_{13}$ arrangement diameter of the devices 13 for non-rotatable connection
F3, F4 spring unit

What is claimed is:
1. A vibration damper (1), comprising:
at least two damper assemblies (3, 4) connectable in series and including a component with a recess (11);
a floating intermediary flange (2) coupling the at least two damper assemblies and including an axial protrusion (10); and
torque transmission devices or damping coupling devices ($7_3$, $7_4$, $8_3$, $8_4$), rotation angle limiting devices (9, 23) between the floating intermediary flange (2) and a damper component of one of the damper assemblies (3, 4), wherein:

the damper component is disposed in a force flow in front or behind the floating intermediary flange;

the rotation angle limiting devices (2, 23) include at least one axial protrusion (10) disposed at the intermediary flange (2)

the axial protrusion is oriented in axial direction towards the respective other damper component disposed in front in the force flow or the damper component disposed subsequent in the force flow the axial protrusion (10) is at least partially disposed in the recess (11) in a circumferential direction with a clearance;

the clearance characterizes a respective permissible rotation angle ($\beta$); and the axial protrusion (10) is disposed at the intermediary flange (2) in a portion of radial protrusions (17) which form contact and support surfaces (18, 19) for the devices ($7_3$, $7_4$, $8_3$, $8_4$) for torque transmission or damping coupling.

2. The device (1) according to claim 1, wherein the axial protrusion (10) and the intermediary flange (2) is configured as an integral one piece component.

3. The device (1) according to claim 1, wherein the axial protrusion (10) is configured in a radial direction within the effective diameter ($d_{3,4}$) of the torque transmission devices ($7_3$, $7_4$, $8_3$, $8_4$) and damping coupling devices, in particular within these devices at the intermediary flange (2).

4. The device (1) according to claim 1, wherein the recess (11) is configured as a pass through opening at the intermediary flange (2).

5. The device (1) according to claim 1, wherein the axial protrusion (10) and recess (11) are respectively disposed on an arrangement radius ($d_{10}$, $d_{11}$) and are disposed in circumferential direction at a constant distance from one another.

6. The device (1) according to claim 1, wherein:

each damper assembly (3, 4) includes an input component and an output component (3E, 3A, 4E, 4A) and the intermediary flange (2) forms the output component (3A) of the first damper assembly (3) and the input component (4E) of the second damper assembly (4);

the intermediary flange is configured in plural components or integral and the input component (3E) of the first damper assembly (3) is configured and disposed, so that the input component is connectable with an actuatable clutch device and with a turbine shell, while the output component (4A) of the second damper assembly (4) is connectable non-rotatably with an output side component; and the rotation angle limiting devices are provided between the input component (3A) and the intermediary flange (2) or between the intermediary flange (2) and the output component (4A) of the second damper assembly (4).

7. A vibration damper, comprising:

a damper hub;

a plurality of spring units;

at least one input component including first and second non-rotatably connected lateral disks engaged with every spring in the plurality of spring units, the first lateral disk including at least one recess having a first extent in a circumferential direction defined by a radially outermost end of a line perpendicular to an axis of rotation for the vibration damper and at a fixed distance from the axis of rotation;

an output component including a flange engaged with every spring in the plurality of spring units and with a radially innermost portion non-rotatably connected to the damper hub; and a floating intermediary flange engaged with every spring in the plurality of spring units and including at least one axial protrusion at least partially disposed in the at least one recess and having a second extent, in the circumferential direction, less than the first extent.

8. A vibration damper, comprising:

a damper hub including an inner circumferential surface with a plurality of splines;

a plurality of spring units;

at least one input component including at least one lateral disk directly engaged with the plurality of spring units;

an output component including a flange directly engaged with the plurality of spring units and with a radially innermost portion non-rotatably connected to the damper hub; and a floating intermediary flange, different from the flange, directly engaged with the plurality of spring units, and at least partially rotatable with respect to the at least one input component, wherein:

every spring in the vibration damper is located at a same single radial distance from an axis of rotation for the vibration damper;

one of the first lateral disk or the floating intermediary flange includes at least one recess located radially inward of the plurality of springs and having a first extent in a circumferential direction defined by a radially outermost end of a line perpendicular to the axis of rotation and at a fixed distance from the axis of rotation; and the other of the first lateral disk or the floating intermediary flange includes at least one axial protrusion at least partially disposed in the at least one recess and having a second extent, in the circumferential direction, less than the first extent.

* * * * *